(12) United States Patent
Sugiyama et al.

(10) Patent No.: US 12,542,465 B2
(45) Date of Patent: Feb. 3, 2026

(54) STATOR

(71) Applicants: AISIN CORPORATION, Aichi (JP); TOYOTA JIDOSHA KABUSHIKI KAISHA, Toyota (JP); DENSO CORPORATION, Kariya (JP)

(72) Inventors: Toshiya Sugiyama, Kariya (JP); Munehiro Takahashi, Kariya (JP); Keisuke Kimura, Kariya (JP); Ken Takeda, Kariya (JP); Takahito Nozawa, Toyota (JP); Takashi Matsumoto, Toyota (JP); Yoshitada Yamagishi, Okazaki (JP); Katsuhide Kitagawa, Seto (JP); Hajime Kato, Toyota (JP)

(73) Assignees: AISIN CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 232 days.

(21) Appl. No.: 18/278,550

(22) PCT Filed: Feb. 1, 2022

(86) PCT No.: PCT/JP2022/003826
§ 371 (c)(1),
(2) Date: Aug. 23, 2023

(87) PCT Pub. No.: WO2022/201878
PCT Pub. Date: Sep. 29, 2022

(65) Prior Publication Data
US 2024/0146140 A1 May 2, 2024

(30) Foreign Application Priority Data
Mar. 24, 2021 (JP) .................. 2021-050767

(51) Int. Cl.
*H02K 3/50* (2006.01)
*H02K 1/16* (2006.01)
*H02K 1/18* (2006.01)

(52) U.S. Cl.
CPC ............... *H02K 3/50* (2013.01); *H02K 1/182* (2013.01); *H02K 1/16* (2013.01); *H02K 2201/03* (2013.01)

(58) Field of Classification Search
CPC ....................................................... H02K 3/50
(Continued)

(56) References Cited

U.S. PATENT DOCUMENTS

2018/0278113 A1\* 9/2018 Asahi ........................ H02K 5/24
2019/0097484 A1\* 3/2019 Kaneshige ............. H02K 15/33

FOREIGN PATENT DOCUMENTS

JP 2019-068494 A 4/2019

OTHER PUBLICATIONS

May 29, 2024 extended Search Report issued in European Patent Application No. 22774680.7.

\* cited by examiner

*Primary Examiner* — Terrance L Kenerly
*Assistant Examiner* — Theodore L Perkins
(74) *Attorney, Agent, or Firm* — Oliff PLC

(57) ABSTRACT

In this stator, lead wire extended portions and a power wire extended portion are extended from a resin portion by an extended portion separating portion such that the lead wire extended portions are separated from the power wire extended portion by distances that are greater than a maximum value of the width of clearance between an end-side portion of the lead wire extended portion and a facing (Continued)

portion located next to the end-side portion, the resin portion being provided so as to cover lead wire portions and a power wire portion.

8 Claims, 3 Drawing Sheets

(58) Field of Classification Search
USPC .......................................................... 310/71
See application file for complete search history.

STATOR

TECHNICAL FIELD

The present disclosure relates to stators.

BACKGROUND ART

A stator including a power wire portion joined to a lead wire portion of a coil is conventionally known in the art. Such a stator is disclosed in, for example, Japanese Unexamined Patent Application Publication No. 2019-68494 (JP 2019-68494 A).

JP 2019-68494 A discloses a rotating electrical machine stator that includes a stator core and a three-phase coil having coil end portions protruding from axial end faces of the stator core. The rotating electrical machine stator further includes power wires connected (joined) to three input terminal portions of the three-phase coil via joint portions, and a resin mold integrally fixing the coil end portion and the joint portions. The input terminal portion and the power wire that are joined to each other are disposed such that the input terminal portion and the power wire are located next (adjacent) to each other and face each other in the radial direction inside the resin mold.

RELATED ART DOCUMENTS

Patent Documents

Patent Document 1: Japanese Unexamined Patent Application Publication No. 2019-68494 (JP 2019-68494 A)

SUMMARY OF THE DISCLOSURE

Problem to be Solved by the Disclosure

In the rotating electrical machine stator disclosed in JP 2019-68494 A, however, since the input terminal portion and the power wire that are joined to each other are disposed such that the input terminal portion and the power wire are located next to each other and face each other in the radial direction inside the resin mold, a very small gap is sometimes formed between the input terminal portion and the power wire. In this case, a resin layer with a small thickness is formed in the very small gap. This resin layer with a small thickness (thin resin layer) has low durability due to the small thickness. This is disadvantageous in that the resin layer breaks when stress is applied to the resin layer while the rotating electrical machine is in operation etc. In this case, there is a problem that the insulation properties of the resin mold (resin portion) decrease due to the breakage of the resin layer.

The present disclosure was made to solve the above problem, and it is one object of the present disclosure to provide a stator capable of preventing the insulation properties of a resin portion from decreasing due to breakage of a thin resin layer inside the resin portion.

Means for Solving the Problem

In order to achieve the above object, a stator according to one aspect of the present disclosure includes: a stator core including slots; a coil including slot-housed portions housed in the slots, a coil end portion protruding from an end face in an axial direction of the stator core, and a lead wire portion to which external electric power is supplied; a power wire portion that includes a joint portion joined to an end-side portion of the lead wire portion and a facing portion continuous with the joint portion and located next to the end-side portion with clearance between the facing portion and the end-side portion, and that supplies the external electric power to the coil; and a resin portion provided so as to cover the lead wire portion and the power wire portion. The lead wire portion and the power wire portion include a lead wire extended portion and a power wire extended portion that are extended from the resin portion, respectively. Either or both of a portion of the lead wire portion that is located between the end-side portion and the lead wire extended portion and a portion of the power wire portion that is located between the facing portion and the power wire extended portion include an extended portion separating portion, the extended portion separating portion being configured to extend the lead wire extended portion and the power wire extended portion from the resin portion in such a manner that the lead wire extended portion and the power wire extended portion are separated from each other by a distance that is greater than a maximum value of a width of the clearance in a direction in which the end-side portion and the facing portion face each other.

In the stator according to the aspect of the present disclosure, as described above, the lead wire extended portion and the power wire extended portion are extended from the resin portion by the extended portion separating portion in such a manner that the lead wire extended portion and the power wire extended portion are separated from each other by the distance that is greater than the maximum value of the width of the clearance between the end-side portion and the facing portion. Accordingly, the separation distance between the portion of the lead wire portion that is located between the end-side portion and the lead wire extended portion and the portion of the power wire portion that is located between the facing portion and the power wire extended portion can be made relatively large. As a result, a thin resin layer can be prevented from being formed between the portion of the lead wire portion that is located between the end-side portion and the lead wire extended portion and the portion of the power wire portion that is located between the facing portion and the power wire extended portion inside the resin portion. The amount of thin resin layer that is formed inside the resin portion can thus be reduced. As a result, the insulating properties of the resin portion can be prevented from decreasing due to breakage of the thin resin layer from stress.

Effects of the Disclosure

According to the present disclosure, the insulating properties of the resin portion can be prevented from decreasing due to breakage of the thin resin layer inside the resin portion.

MODES FOR CARRYING OUT THE DISCLOSURE

Hereinafter, an embodiment of the present disclosure will be described with reference to the drawings.

Embodiment

The structure of a stator 100 according to the present embodiment will be described with reference to FIGS. 1 to 6. In the following description, an axial direction, a radial direction, and a circumferential direction of a stator core 10 (see FIG. 1) of the stator 100 are defined as "Z direction," "R direction," and "C direction," respectively. One side and the other side in the axial direction (Z direction) are defined as "Z1 side" and "Z2 side," respectively. The inner side and the outer side in the radial direction (R direction) are defined as "R1 side" and "R2 side," respectively.

Figure 1:
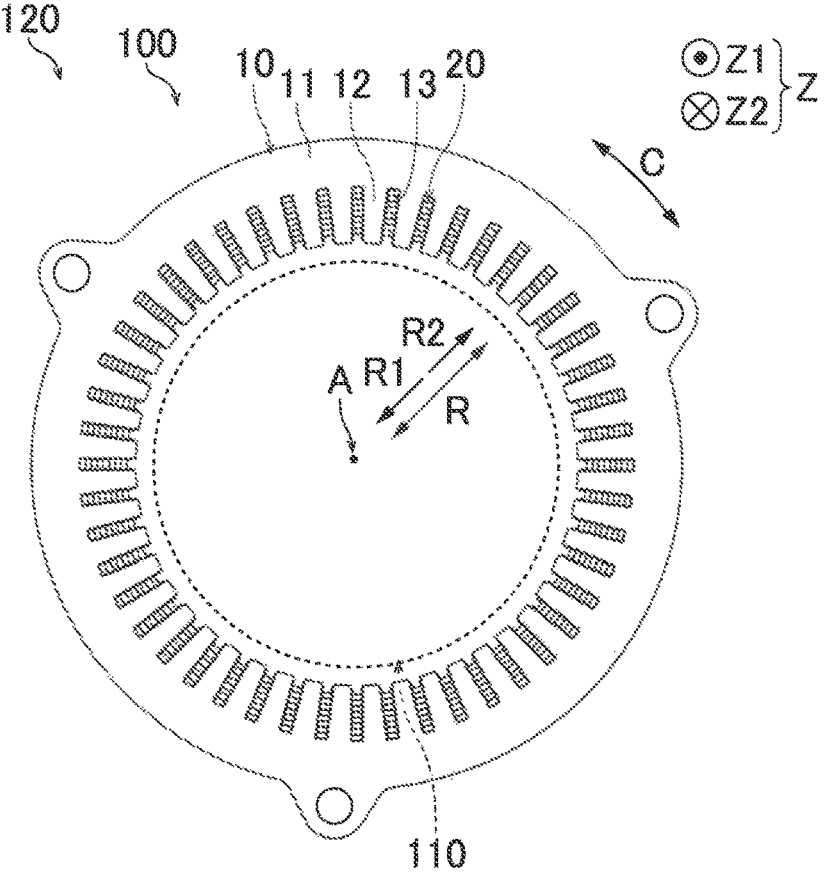
FIG. 1 is a plan view showing the configuration of a rotating electrical machine according to an embodiment.
Figure 2:
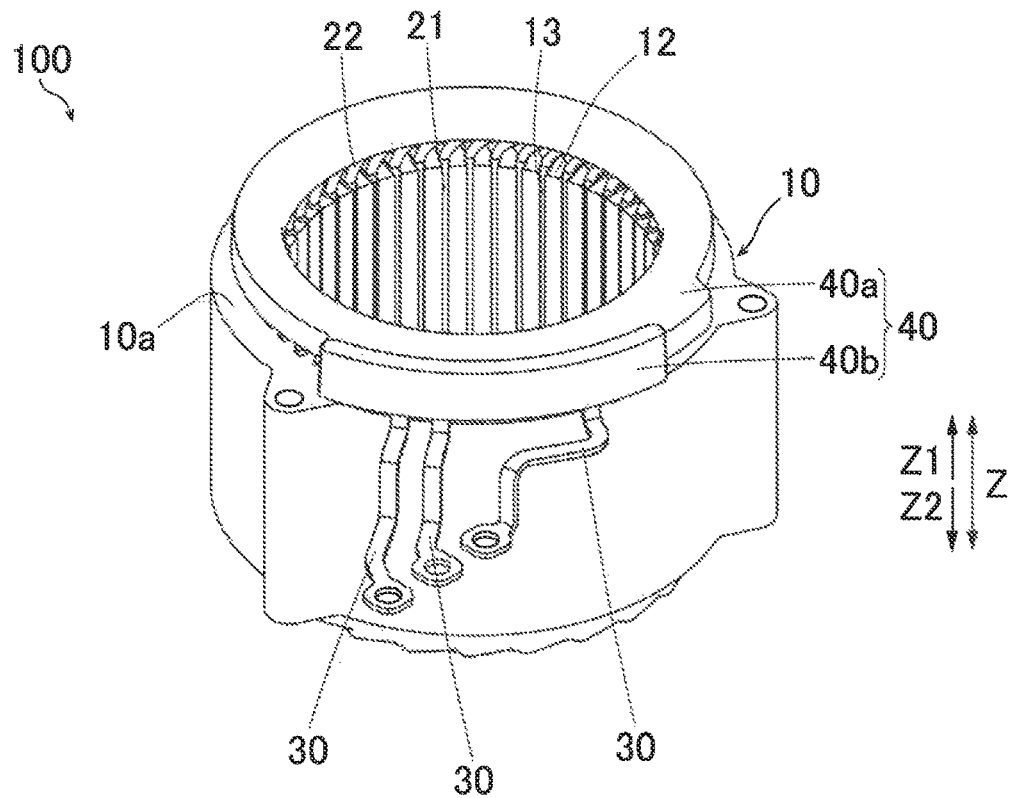
FIG. 2 is a perspective view showing the configuration of a stator according to the embodiment.

As shown in FIG. 1, the stator 100 together with a rotor 110 forms a rotating electrical machine 120. For example, the rotating electrical machine 120 is a motor, a generator, or a motor generator. The rotor 110 is disposed on the R1 side of the stator 100 so as to face the stator 100 in the R direction. That is, the stator 100 is formed as part of the inner rotor rotating electrical machine 120. For simplicity, power wire portions 30 (see FIG. 2) and an immersing resin portion 40 (see FIG. 2), which will be described later, are not shown in FIG. 1.

The stator 100 includes the stator core 10. The stator core 10 has a cylindrical shape about a central axis A along the Z direction (rotation axis of the rotor 110). The stator core 10 is formed by stacking a plurality of electrical steel sheets (e.g., silicon steel sheets) in the Z direction. The stator core 10 includes an annular back yoke 11, a plurality of teeth 12 protruding from the back yoke 11 toward the R1 side, and a plurality of slots 13 formed between the teeth 12 adjacent to each other in the C direction. The slots 13 are formed so as to extend in the Z direction. The slots 13 are open on both the Z1 side and the Z2 side. The slots 13 are open on the R1 side as viewed in the Z direction.

The stator 100 includes a coil 20. The coil 20 is disposed in the stator core 10. The coil 20 is provided for three phases (U-phase, V-phase and W-phase). The coil 20 is formed by electrically connecting a plurality of segment conductors. The coil 20 is a rectangular wire (rectangular conductor) with a substantially rectangular cross section. For example, the coil 20 is made of copper or aluminum.

Figure 3:
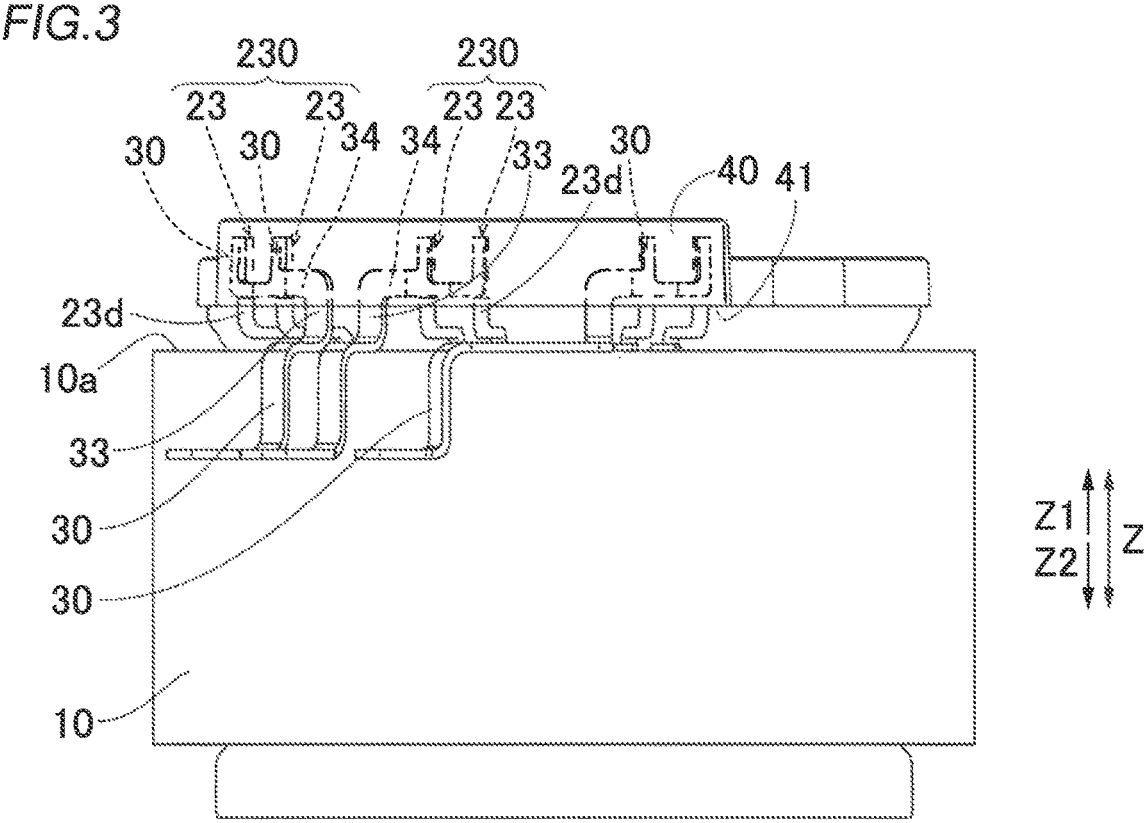
FIG. 3 is a front view showing the configuration of the inside of an immersing resin portion of the stator according to the embodiment.

As shown in FIG. 3, the coil 20 includes slot-housed portions 21 (see FIG. 2), a coil end portion 22 (see FIG. 2), and lead wire portions 23. The slot-housed portions 21 are housed in the slots 13. The coil end portion 22 is connected to the slot-housed portions 21 and protrudes from an end face 10a in the Z direction of the stator core 10 to the outside of the slots 13. The lead wire portions 23 are configured to be supplied with electric power from the outside of the stator 100, as will be described later. An end-side portion 23a (see FIG. 6) of the lead wire portion 23 is located on the R2 side with respect to the coil end portion 22.

Figure 4:
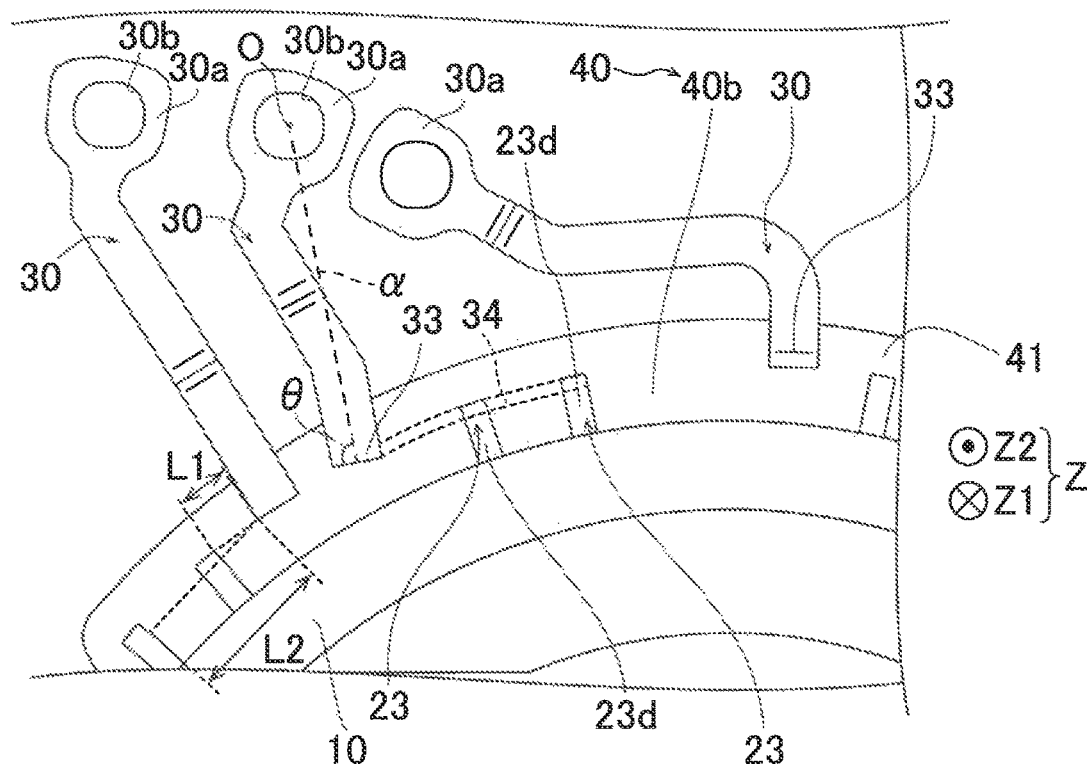
FIG. 4 is a plan view of the immersing resin portion according to the embodiment as viewed in a Z2 direction.

As shown in FIG. 4, the coil 20 includes the lead wire portions 23 of a plurality of phases (in the present embodiment, three phases). The coil 20 includes a same-phase lead wire portion 230 (see FIG. 3) in which a plurality of (in the present embodiment, two) lead wire portions 23 of the same phase is located next to each other in the circumferential direction. The same-phase lead wire portion 230 is provided for each of the plurality of phases. Specifically, two U-phase lead wire portions 23, two V-phase lead wire portions 23, and two W-phase lead wire portions 23 are provided.

The lead wire portion 23 includes a radial portion 23b (see FIG. 6) extending radially outward from the coil end portion 22 side (R1 side), and an axial portion 23c (see FIG. 6) extending in the axial direction (toward the Z1 side) from the radially outer end of the radial portion 23b. That is, the lead wire portion 23 is formed in an L-shape. The lead wire portion 23 may have a shape other than the L-shape. The end-side portion 23a of the lead wire portion 23 is part on the Z1 side of the axial portion 23c of the lead wire portion 23. The end-side portion 23a is a bare wire portion from which an insulating coating, not shown, has been removed. The axial portion 23c is covered with the insulating coating, not shown.

As shown in FIGS. 3 and 4, the stator 100 includes the power wire portions 30 that supply electric power from the outside to the coil 20. The power wire portions 30 are provided corresponding to the three-phase lead wire portions 23. That is, three power wire portions 30 are provided. The electric power from the outside is, for example, electric power supplied from an inverter. The power wire portions 30 are, for example, bus bars etc.

In the present embodiment, each of the lead wire portions 23 and the power wire portions 30 is formed by a rectangular conductor. That is, each of the lead wire portions 23 and the power wire portions 30 has a rectangular cross section. A circumferential width W2 (see FIG. 5) of the lead wire portion 23, which will be described later, is substantially equal to a circumferential width W3 (see FIG. 5) of a joint portion 31 and facing portion 32 of the power wire portion 30, which will be described later.

The stator 100 further includes the immersing resin portion 40 provided so as to cover the lead wire portions 23 and the power wire portions 30. The immersing resin portion 40 is formed by immersing in a resin material (liquid resin material) the lead wire portions 23 and power wire portions 30 that are provided on the coil end portion 22 side (Z1 direction side) with respect to the end face 10a of the stator core 10. Specifically, the immersing resin portion 40 is formed by thermally curing the resin material with the lead wire portions 23 and power wire portions 30 immersed in the resin material. The immersing resin portion 40 is formed in an annular shape (see FIG. 2) so as to cover the end face 10a of the annular stator core 10 from the Z1 side. The immersing resin portion 40 is an example of the "resin portion" in the claims.

Figure 5:
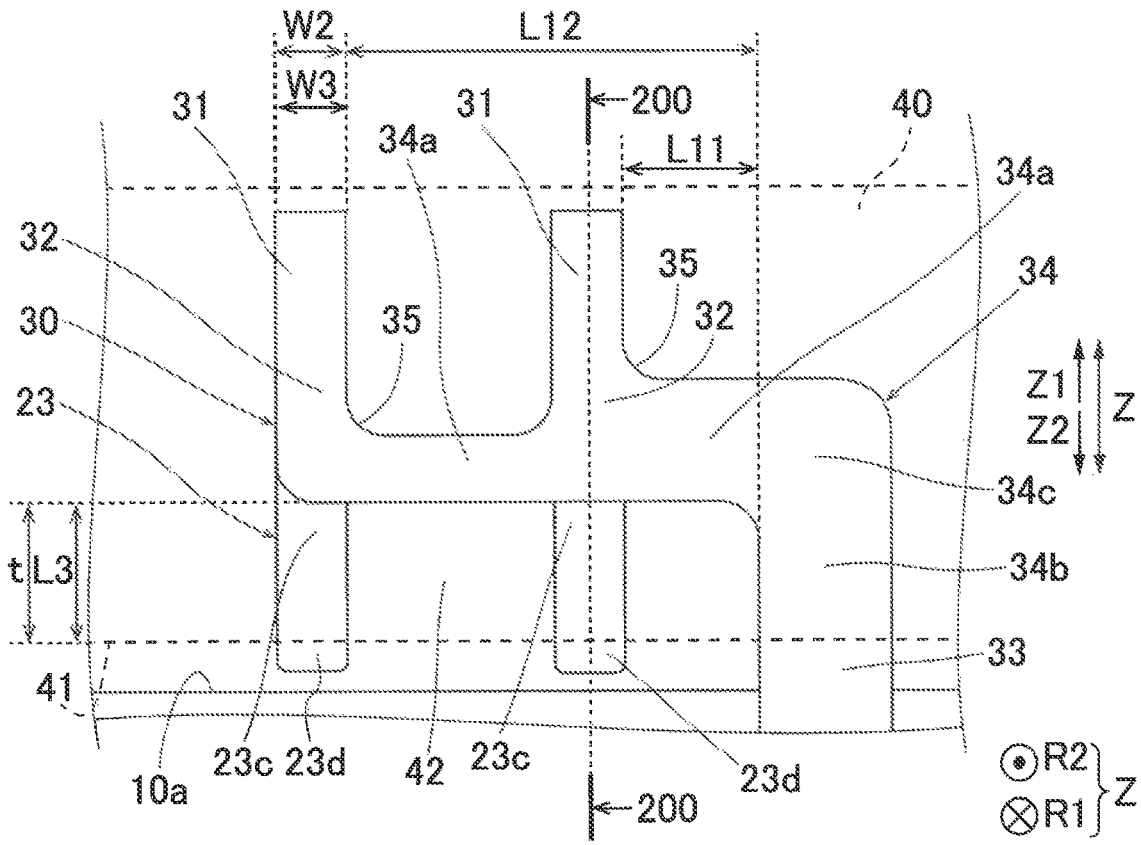
FIG. 5 is a front view showing lead wire portions and a power wire portion inside the immersing resin portion according to the embodiment as viewed from the outside in the radial direction.

As shown in FIG. 5, the immersing resin portion 40 is provided so as to cover the axial portions 23c of the lead wire portions 23 and the joint portions 31, facing portions 32, and offset portions 34, which will be described later, of the power wire portions 30.

The power wire portion 30 includes the joint portions 31 joined to the end-side portions 23a of the lead wire portions 23. The power wire portion 30 further includes the facing portions 32 continuous with the joint portions 31. The facing portion 32 is located on the Z2 side of the joint portion 31 and continuous with the joint portion 31. The facing portion 32 is located next to the end-side portion 23a of the lead wire portion 23 with clearance C1 (see FIG. 6) between the facing portion 32 and the end-side portion 23a. That is, a part on the Z1 side of the end-side portion 23a of the lead wire portion 23 is joined to the joint portion 31 of the power wire portion 30, and the remaining part on the Z2 side of the end-side portion 23a is located so as to face the facing portion 32 of the power wire portion 30 in the radial direction.

Figure 6:
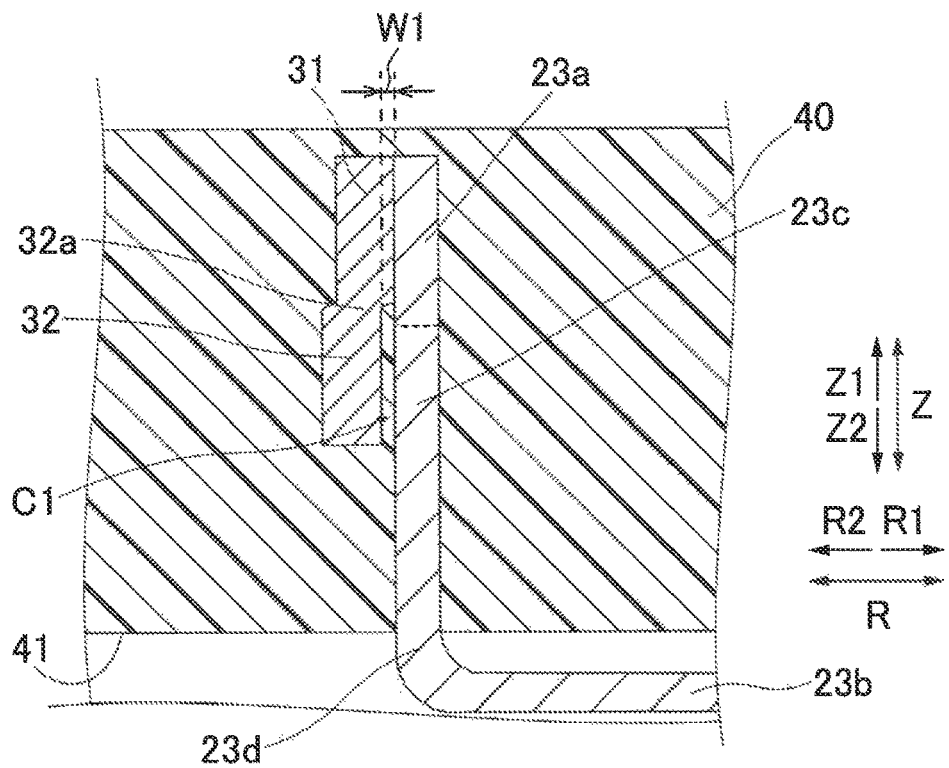
FIG. 6 is a sectional view taken along line 200-200 in FIG. 5.

As shown in FIG. 6, the power wire portion 30 is formed such that the position of the joint portion 31 is shifted toward the lead wire portion 23 (R1 side) with respect to the position of the facing portion 32. Specifically, a shift portion 32a that shifts the facing portion 32 toward the R2 side (in the direction away from the lead wire portion 23) is provided between the joint portion 31 and the facing portion 32. The clearance C1, which will be described later, is thus provided between the facing portion 32 and the lead wire portion 23. In FIG. 6, the boundary between the end-side portion 23a that is a bare conductor and the axial portion 23c covered with the insulating coating is shown by a dashed line.

As shown in FIG. 5, the lead wire portion 23 includes a lead wire extended portion 23d extended from the immersing resin portion 40. The power wire portion 30 includes a power wire extended portion 33 extended from the immersing resin portion 40. Specifically, each of the lead wire extended portion 23d and power wire extended portion 33 is extended from a resin end face 41 located on the end face 10a side of the stator core 10. The resin end face 41 is a surface of a protruding resin portion 40b (see FIG. 2) of the immersing resin portion 40 that is located on the end face 10a side of the stator core 10. The resin end face 41 is a surface extending perpendicularly to the axial direction. The lead wire extended portion 23d refers to a portion located near the resin end face 41 out of a portion of the lead wire portion 23 that is extended from the immersing resin portion 40. The power wire extended portion 33 refers to a portion located near the resin end face 41 out of a portion of the power wire portion 30 that is extended from the immersing resin portion 40.

As shown in FIG. 4, the resin end face 41 is formed so as to protrude radially outward from the end face 10a (see FIG. 3) of the stator core 10. The power wire extended portions 33 of the power wire portions 30 corresponding to the three-phase lead wire portions 23 are located at substantially the same position in the radial direction. In other words, the radial distances (not labeled) between each of the three power wire extended portions 33 and the central axis A (see FIG. 1) are substantially equal to each other.

Like the power wire extended portions 33, the offset portions 34 (see FIG. 3) of the three-phase power wire portions 30, which will be described later, are also located at substantially the same position in the radial direction.

In the present embodiment, as shown in FIG. 5, a portion of the power wire portion 30 that is located between each facing portion 32 and the power wire extended portion 33 includes the offset portion 34 for extending the lead wire extended portions 23d and the power wire extended portion 33 from the immersing resin portion 40 such that the lead wire extended portions 23d are separated from the power wire extended portion 33 by distances (L1, L2) (see FIG. 4) larger than a maximum value of a width W1 (see FIG. 6) of the clearance C1 in the direction in which the end-side portion 23a and the facing portion 32 face each other (in the present embodiment, the radial direction). The distances L1, L2 are schematically shown in FIG. 4. The distances (L1, L2) refer to the shortest distances between the lead wire extended portions 23d and the power wire extended portion 33. The offset portion 34 is an example of the "extended portion separating portion" in the claims.

In other words, the lead wire extended portions 23d and the power wire extended portion 33 are extended from the immersing resin portion 40 such that the lead wire extended portions 23d are shifted (offset) from the power wire extended portion 33 by the offset portion 34 rather than facing the power wire extended portion 33 in the radial direction. The distances (L1, L2) are equal to or greater than the circumferential width W2 (see FIG. 5) of the lead wire portion 23 that will be described later.

Each of the power wire portions 30 corresponding to the plurality of phases includes: a plurality of joint portions 31 joined to the end-side portions 23a of the plurality of lead wire portions 23 of a corresponding one of the same-phase lead wire portions 230; a plurality of facing portions 32 continuous with the plurality of joint portions 31; and the offset portion 34 connecting the plurality of facing portions 32 and the power wire extended portion 33.

In each of the plurality of phases, the same-phase lead wire portion 230, the plurality of joint portions 31, and the offset portion 34 are integrally covered with a common immersing resin portion 40. The common immersing resin portions 40 corresponding to the plurality of phases protrude radially outward from the stator core 10, and are provided as a single immersing resin portion 40 on a concentric circumference. Specifically, the same-phase lead wire portion 230, the plurality of joint portions 31, and the offset portion 34 that are provided for each of the plurality of phases protrude radially outward from an annular resin portion 40a (see FIG. 2) of the immersing resin portion 40 that is formed in an annular shape on the end face 10a of the stator core 10, and are covered with the single protruding resin portion 40b (see FIG. 2) formed in an arc shape as viewed in the axial direction. The protruding resin portion 40b is formed integrally with the annular resin portion 40a. The annular resin portion 40a is located so as to cover the coil end portion 22 on the end face 10a.

The offset portion 34 is connected to the facing portions 32 and the power wire extended portion 33 in the power wire portion 30. Specifically, a first portion 34a of the offset portion 34, which will be described later, is connected to the facing portions 32. A second portion 34b of the offset portion 34, which will be described later, is connected to the power wire extended portion 33. The first portion 34a and the second portion 34b are connected to each other. The lead wire portions 23 do not have a portion having such a function as that of the offset portion 34. Specifically, the lead wire portions 23 are formed linearly in the axial direction inside the immersing resin portion 40.

As shown in FIGS. 4 and 5, the offset portion 34 is disposed so as to extend in the circumferential direction as viewed in the axial direction, and is provided so as to extend from the facing portions 32 (FIG. 5) in a direction toward a terminal fixing portion 30a (see FIG. 4) located at the opposite end of the power wire portion 30 from the joint portions 31 (see FIG. 5). For simplicity, only the offset portion 34 of one phase is shown by dashed lines in FIG. 4, but the offset portions 34 of the other phases are also similar to this offset portion 34.

As shown in FIG. 4, the power wire extended portion 33 is located perpendicularly to a line segment α connecting the power wire extended portion 33 and the center O of a hole 30b that is formed in the terminal fixing portion 30a and into which an external terminal is inserted, as viewed in the axial direction. That is, the power wire extended portion 33 is located so as to extend at an angle θ with respect to the line segment α. The angle θ is 90 degrees. For simplicity, FIG.

4 shows an example in which the angle θ is 90 degrees for only one phase. However, the configuration is similar for the other phases as well.

In the present embodiment, the offset portion 34 includes the first portion 34a located so as to extend in the circumferential direction from the facing portions 32. The offset portion 34 further includes the second portion 34b extending in the axial direction (toward the Z2 side) from an opposite end 34c of the first portion 34a from the facing portions 32 and connected to the power wire extended portion 33. Specifically, the first portion 34a of the offset portion 34 extends perpendicularly to the lead wire portions 23 (axial portions 23c) inside the immersing resin portion 40, as viewed from the outside in the radial direction. That is, the offset portion 34 is composed of the first portion 34a extending in the circumferential direction and the second portion 34b extending in the axial direction from the end 34c of the first portion 34a. The offset portion 34 thus has an L-shape as viewed from the outside in the radial direction. The first portion 34a may cross, rather than extending perpendicularly to, the lead wire portions 23 (axial portions 23c) inside the immersing resin portion 40, as viewed from the outside in the radial direction.

In the present embodiment, the first portion 34a of the offset portion 34 is curved in the circumferential direction from the facing portions 32 extending in the axial direction. That is, the power wire portion 30 includes connection portions 35 connecting the first portion 34a of the offset portion 34 and the facing portions 32 and formed in an arc shape with a predetermined curvature as viewed from the outside in the radial direction.

Of the plurality of lead wire portions 23, the lead wire portions 23 of the same phase are joined to one of the plurality of joint portions 31 branching off from the first portion 34a of the common offset portion 34. Specifically, the two offset portions 34 (first portions 34a) extending from the facing portions 32 facing the two lead wire portions 23 (end-side portions 23a) located next to each other in the circumferential direction are formed so as to extend in the same direction (to the right in FIG. 5). The first portions 34a of the two offset portions 34 are provided as a single first portion 34a (are integrated on the right side of the right lead wire portion 23 in the figure) and connected to the common second portion 34b.

The direction in which the first portion 34a of the offset portion 34 extends from the facing portions 32 is not limited to the above configuration. As shown in FIG. 4, in the stator 100 of the present embodiment, only one of the three power wire portions 30 located next to each other in the circumferential direction (leftmost power wire portion 30 in FIG. 4) is different from the other two power wire portions 30 in the direction in which the first portion 34a (see FIG. 5) of the offset portion 34 extends from the facing portions 32 (see FIG. 5). Specifically, only the first portion 34a of the leftmost power wire portion 30 in FIG. 4 is provided so as to extend to the right in the figure from the facing portions 32, and the first portions 34a of the other two power wire portions 30 are provided so as to extent to the left in the figure from the facing portions 32. The direction in which each of the first portions 34a of the three power wire portions 30 extends is not limited to the above configuration.

In the present embodiment, as shown in FIG. 5, the lead wire extended portions 23d and the power wire extended portion 33 are located so as to be shifted in circumferential position from each other by the first portion 34a of the offset portion 34, so that the lead wire extended portions 23d are separated from the power wire extended portion 33 in the circumferential direction by distances (L11, L12) that are equal to or greater than the circumferential width W2 of the lead wire portion 23. The distance L11 is the distance in the circumferential direction between one of the two lead wire extended portions 23d that is located closer to the power wire extended portion 33 and the power wire extended portion 33. The distance L12 is the distance in the circumferential direction between one of the two lead wire extended portions 23d that is located farther away from the power wire extended portion 33 and the power wire extended portion 33.

Specifically, the maximum value of the width W1 (see FIG. 6) of the clearance C1 is, for example, about 0.5 mm. The circumferential width W2 of the lead wire portion 23 is, for example, about 2.5 mm. That is, the distances (L11, L12) by which the lead wire extended portions 23d are separated from the power wire extended portion 33 in the circumferential direction are at least five times the maximum value of the width W1 of the clearance C1.

The second portion 34b of the offset portion 34 is thus separated from the lead wire portions 23 in the circumferential direction by the distances (L11, L12) inside the immersing resin portion 40. That is, the circumferential thicknesses (not labeled) of the resin layer between the second portion 34b of the offset portion 34 and the lead wire portions 23 are equal to the distances (L11, L12). The distances (L1, L2) by which the lead wire extended portions 23d are separated from the power wire extended portion 33 are distances that are correlated with the circumferential distances (L11, L12).

In the present embodiment, an axial thickness t of a portion 42 of the immersing resin portion 40 that is located between the first portion 34a of the offset portion 34 and the resin end face 41 is greater than the maximum value of the radial width W1 of the clearance C1. That is, an axial length L3 of a portion of the lead wire portion 23 inside the immersing resin portion 40 that is not located next to the power wire portion 30 in the radial direction but is offset from the power wire portion 30 in the circumferential direction is equal to the thickness t of the portion 42 and is greater than the maximum value of the width W1 of the clearance C1.

The axial thickness t of the portion 42 is greater than the maximum value of the radial width W1 of the clearance C1, and is equal to or greater than the circumferential width W2 of the lead wire portion 23. That is, the thickness t of the portion 42 is also at least five times the maximum value of the width W1 of the clearance C1, like the distances (L11, L12) by which the lead wire extended portions 23d are separated from the power wire extended portion 33 in the circumferential direction.

Effects of Embodiment

The following effects can be obtained with the present embodiment.

In the present embodiment, as described above, either or both of the portion of the lead wire portion (23) that is located between the end-side portion (23a) and the lead wire extended portion (23d) and the portion of the power wire portion (30) that is located between the facing portion (32) and the power wire extended portion (33) include the extended portion separating portion (34), the extended portion separating portion (34) being configured to extend the lead wire extended portion (23d) and the power wire extended portion (33) from the resin portion (40) in such a manner that the lead wire extended portion (23d) and the power wire extended portion (33) are separated from each other by the distance (L1, L2) that is greater than the maximum value of the width (W1) of the clearance (C1) in the direction in which the end-side portion (23a) and the facing portion (32) face each other. Accordingly, the separation distance between the portion of the lead wire portion (23) that is located between the end-side portion (23a) and the lead wire extended portion (23d) and the portion (offset portion (34)) of the power wire portion (30) that is located between the facing portion (32) and the power wire extended portion (33) can be made relatively large. As a result, a thin resin layer can be prevented from being formed between the portion of the lead wire portion (23) that is located between the end-side portion (23a) and the lead wire extended portion (23d) and the portion of the power wire portion (30) that is located between the facing portion (32) and the power wire extended portion (33) inside the resin portion (40). The amount of thin resin layer that is formed inside the resin portion can thus be reduced. As a result, the insulating properties of the resin portion (40) can be prevented from decreasing due to breakage of the thin resin layer from stress.

In the present embodiment, as described above, the extended portion separating portion (34) is connected to the facing portion (32) and the power wire extended portion (33) in the power wire portion (30). The power wire extended portion (33) can therefore be easily disposed at a position away from the facing portion (32).

In the present embodiment, as described above, the extended portion separating portion (34) is not provided in the lead wire portion (23), but is provided in the power wire portion (30). The configuration of the stator (100) can therefore be simplified as compared to the case where the extended portion separating portion (34) is provided in both the lead wire portion (23) and the power wire portion (30). Moreover, since it is not necessary to form the extended portion separating portions (34) in both the lead wire portion (23) and the power wire portion (30), the manufacturing process of the stator (100) can be simplified.

In the present embodiment, as described above, the lead wire portion (23) is provided so as to extend in the axial direction inside the resin portion (40). The end-side portion (23a) of the lead wire portion (23) and the facing portion (32) of the power wire portion (30) are provided so as to face each other in the radial direction. The extended portion separating portion (34) includes an offset portion (34), the offset portion (34) including the first portion (34a) provided so as to extend in the circumferential direction from the facing portion (32), and the second portion (34b) extending in the axial direction from the opposite end (34c) of the first portion (34a) from the facing portion (32) and connected to the power wire extended portion (33). Since the offset portion (34) includes the first portion (34a), the lead wire extended portion (23d) and the power wire extended portion (33) can be disposed so as to be shifted (offset) from each other in the circumferential direction. As a result, the circumferential thickness of a resin layer between the lead wire portion (23) and the power wire portion (30) (second portion (34b) of the offset portion (34)) can be easily increased by an amount corresponding to the amount of shift in the circumferential direction.

In the present embodiment, as described above, the lead wire extended portion (23d) and the power wire extended portion (33) are located so as to be shifted in circumferential position from each other by the first portion (34a) of the offset portion (34), and are thus separated from each other in the circumferential direction by the distance (L11, L12) equal to or greater than the circumferential width (W2) of the lead wire portion (23). Accordingly, the circumferential thickness of the resin layer between the lead wire portion (23) and the power wire portion (30) (second portion (34b) of the offset portion (34)) can further be increased as compared to the case where the lead wire extended portion (23d) and the power wire extended portion (33) are separated from each other by a distance smaller than the circumferential width (W2) of the lead wire portion (23).

In the present embodiment, as described above, each of the lead wire extended portion (23d) and the power wire extended portion (33) is extended from the resin end face (41) located on the end face (10a) side of the stator core (10). The axial thickness (t) of the portion (42) of the resin portion (40) that is located between the first portion (34a) of the offset portion (34) and the resin end face (41) is greater than the maximum value of the radial width (W1) of the clearance (C1). The mechanical strength of the portion (42) can therefore be increased as compared to the case where the thickness (t) of the portion (42) of the resin portion (40) that is located between the first portion (34a) of the offset portion (34) and the resin end face (41) is equal to or less than the maximum value of the radial width (W1) of the clearance (C1). As a result, the portion (42) can be prevented from breaking due to stress. Therefore, reduction in insulating properties of the resin portion (40) can be prevented.

In the present embodiment, as described above, the axial thickness (t) of the portion (42) of the resin portion (40) that is located between the first portion (34a) of the offset portion (34) and the resin end face (41) is greater than the maximum value of the radial width (W1) of the clearance (C1) and equal to or greater than the circumferential width (W2) of the lead wire portion (23). The portion (42) can thus be more reliably prevented from breaking due to stress as compared to the case where the thickness (t) of the portion (42) is smaller than the circumferential width (W2) of the lead wire portion (23). As a result, reduction in insulating properties of the resin portion (40) can be more reliably prevented.

In the present embodiment, as described above, the first portion (34a) of the offset portion (34) is curved in the circumferential direction from the facing portion (32) extending in the axial direction. The connection portion between the facing portion (32) and the first portion (34a) can thus be prevented from breaking due to stress concentrating on this connection portion, as compared to the case where the first portion (34a) is bent at right angles from the facing portion (32).

In the present embodiment, as described above, the coil (20) includes the lead wire portions (23) of the plurality of phases. A plurality of lead wire portions (23) is provided for each phase. Of the plurality of lead wire portions (23), the lead wire portions (23) of the same phase are joined to one of the plurality of joint portions (31) branching off from the first portion (34a) of the common offset portion (34). The number of offset portions (34) can thus be reduced as compared to the case where the joint portions (31) that are joined to the plurality of lead wire portions (23) of the same phase are provided so as to extend from separate offset portions (34). As a result, the configuration of the power wire portion (30) can be simplified.

In the present embodiment, as described above, each of the lead wire portion (23) and the power wire portion (30) is formed by a rectangular conductor. In the case where both the lead wire portion (23) and the power wire portion (30) are rectangular conductors, the width (W1) of the clearance (C1) between the end-side portion (23a) of the lead wire portion (23) and the facing portion (32) of the power wire portion (30) is narrow in a relatively large part of the clearance (C1), as compared to the case where either or both of the lead wire portion (23) and the power wire portion (30) are round conductors (conductors with a circular cross section). Therefore, the configuration in which either or both of the portion of the lead wire portion (23) that is located between the end-side portion (23a) and the lead wire extended portion (23d) and the portion of the power wire portion (30) that is located between the facing portion (32) and the power wire extended portion (33) include the extended portion separating portion (34) in order to prevent formation of a thin resin layer is particularly effective in the configuration in which the rectangular conductors are used and therefore the width (W1) of the clearance (C1) is narrow in a relatively large part of the clearance (C1).

In the present embodiment, as described above, the resin portion (40) includes the immersing resin portion (40) formed by immersing in the resin material the lead wire portion (23) and the power wire portion (30) that are provided on the coil end portion (22) side with respect to the end face (10a) of the stator core (10). Since the lead wire portion (23) and the power wire portion (30) are immersed in the resin material, the lead wire extended portion (23d) and the power wire extended portion (33) are provided so as to be extended from the common surface (resin end face (41)) of the immersing resin portion (40). In this case, the lead wire portion (23) and the power wire portion (30) tend to be located relatively close to each other inside the immersing resin portion (40). Therefore, the configuration in which either or both of the portion of the lead wire portion (23) that is located between the end-side portion (23a) and the lead wire extended portion (23d) and the portion of the power wire portion (30) that is located between the facing portion (32) and the power wire extended portion (33) include the extended portion separating portion (34) in order to prevent formation of a thin resin layer is particularly effective in the configuration in which the immersing resin portion (40) is used and therefore the lead wire portion (23) and the power wire portion (30) tend to be located relatively close to each other.

In the present embodiment, as described above, the coil (20) is configured in such a manner that the same-phase lead wire portion (230) in which the plurality of lead wire portions (23) of the same phase is located next to each other in the circumferential direction is provided for each of the plurality of the phases. Each of the power wire portions (30) corresponding to the plurality of phases includes a plurality of joint portions (31) joined to the end-side portions (23a) of the plurality of lead wire portions (23) of a corresponding one of the same-phase lead wire portions (230), a plurality of facing portions (32) continuous with the plurality of joint portions (31), and the extended portion separating portion (34) connecting the plurality of facing portions (32) and the power wire extended portion (33). In each of the plurality of phases, the same-phase lead wire portion (230), the plurality of joint portions (31), and the extended portion separating portion (34) are integrally covered with the common resin portion (40), and the common resin portions (40) corresponding to the plurality of phases protrude radially outward from the stator core (10) and are provided as a single resin portion (40) on a concentric circumference. With this configuration, the same-phase lead wire portion (230), the plurality of joint portions (31), and the extended portion separating portion (34) are integrally covered with the common resin portion (40). This can improve the shaking resistance of the joints between the same-phase lead wire portion (230) and the joint portions (31) and improve the vibration resistance of the extended portion separating portion (34). This can also improve the insulation properties of the plurality of end-side portions (23a) of the same-phase lead wire portion (230) (insulation properties against electrically conductive parts such as a motor case). The common resin portions (40) corresponding to the plurality of phases protrude radially outward from the stator core (10) and are provided as a single resin portion (40) on a concentric circumference. This can improve the mechanical strength (rigidity) of the resin portion (40) and improve the resistance of the resin portion (40) against thermal stress and assembly stress.

In the present embodiment, as described above, the extended portion separating portion (34) is located so as to extend in the circumferential direction as viewed in the axial direction, and is provided so as to extend from the facing portion (32) in a direction toward the terminal fixing portion (30a) located at the opposite end of the power wire portion (30) from the joint portion (31). With this configuration, the length of the power wire portion (30) can be reduced. Therefore, the natural frequency of the power wire portion (30) can be increased. As a result, the vibration resistance of the power wire portion (30) can be improved.

In the present embodiment, as described above, the power wire extended portion (33) is located perpendicularly to the line segment ($\alpha$) connecting the center (O) of the hole (30b) and the power wire extended portion (33) as viewed in the axial direction, the hole (30b) being a hole that is provided in the terminal fixing portion (30a) located at the opposite end of the power wire portion (30) from the joint portion (31) and into which an external terminal is inserted. With this configuration, stress can be prevented from being concentrated in the resin portion (40) located adjacent to the corner of the power wire extended portion (33) (stress can be distributed). As a result, the resin portion (40) located adjacent to the corner of the power wire extended portion (33) can be prevented from cracking due to assembly stress, vibration stress, thermal expansion (contraction) stress, etc.

In the present embodiment, as described above, the power wire portion (30) is formed in such a manner that the position of the joint portion (31) is shifted toward the lead wire portion (23) with respect to the position of the facing portion (32). With this configuration, the power wire portion (30) can be prevented from interfering with the boundary between the end-side portion (23a) and the axial portion (23c) in the lead wire portion (23) (boundary between the bare conductor portion and the covered portion covered with the insulating coating). Therefore, the power wire portion (30) can be easily made to surface contact the lead wire portion (23). As a result, the position of the power wire portion (30) can be stably fixed.

Modifications

The embodiment disclosed herein should be construed as illustrative in all respects and not restrictive. The scope of the present disclosure is shown by the claims rather than by the above description of the embodiment, and includes all changes (modifications) that fall within the meaning and scope equivalent to the claims.

For example, the above embodiment illustrates an example in which only the portion of the power wire portion 30 that is located between the facing portions 32 and the power wire extended portion 33 includes the offset portion 34 (extended portion separating portion). However, the present disclosure is not limited to this. A portion of the lead wire portion 23 that is located between the end-side portion 23a and the lead wire extended portion 23d may include an offset portion. Both this portion of the power wire portion and this portion of the lead wire portion may include an offset portion.

The above embodiment illustrates an example in which the lead wire portions 23 extend in the axial direction inside the immersing resin portion 40 (resin portion), and the end-side portions 23a of the lead wire portions 23 face the facing portions 32 of the power wire portion 30 in the radial direction. However, the present disclosure is not limited to this. For example, the lead wire portions 23 may be provided so as to extend in the radial direction inside the immersing resin portion 40, and the end-side portions 23a of the lead wire portions 23 and the facing portions 32 of the power wire portion 30 may be provided so that the end-side portions 23a face the facing portions 32 in the axial direction.

The above embodiment illustrates an example in which the first portion 34a of the offset portion 34 (extended portion separating portion) is provided so as to extend in the circumferential direction. However, the present disclosure is not limited to this. For example, the first portion 34a may be provided so as to extend in the radial direction. In this case, the lead wire extended portions 23d and the power wire extended portion 33 are extended from the immersing resin portion 40 (resin portion) such that the lead wire extended portions 23d and the power wire extended portion 33 are separated from each other in the radial direction.

The above embodiment illustrates an example in which the lead wire extended portions 23d are separated from the power wire extended portion 33 by the distances (L1, L2) equal to or greater than the circumferential width W2 of the lead wire portion 23. However, the present disclosure is not limited to this. The distances (L1, L2) by which the lead wire extended portions 23d are separated from the power wire extended portion 33 may be smaller than the circumferential width W2 of the lead wire portion 23 as long as they are greater than the maximum value of the width W1 of the clearance C1 between the end-side portion 23a of the lead wire portion 23 and the facing portion 32 of the power wire portion 30.

The above embodiment illustrates an example in which the lead wire extended portions 23d are separated from the power wire extended portion 33 in the circumferential direction by the distances (L11, L12) equal to or greater than the circumferential width W2 of the lead wire portion 23. However, the present disclosure is not limited to this. The distances (L11, L12) by which the lead wire extended portions 23d are separated from the power wire extended portion 33 in the circumferential direction may be smaller than the circumferential width W2 of the lead wire portion 23 as long as they are greater than the maximum value of the width W1 of the clearance C1 between the end-side portion 23a of the lead wire portion 23 and the facing portion 32 of the power wire portion 30.

The above embodiment illustrates an example in which the axial thickness t of the portion 42 between the first portion 34a of the offset portion 34 and the resin end face 41 is equal to or greater than the circumferential width W2 of the lead wire portion 23. However, the present disclosure is not limited to this. The axial thickness t of the portion 42 may be smaller than the circumferential width W2 of the lead wire portion 23 as long as the axial thickness t is greater than the maximum value of the width W1 of the clearance C1 between the end-side portion 23a of the lead wire portion 23 and the facing portion 32 of the power wire portion 30.

The above embodiment illustrates an example in which two lead wire portions 23 are provided for each phase. However, the present disclosure is not limited to this. Only one lead wire portion 23 may be provided for each phase, or three or more lead wire portions 23 may be provided for each phase.

The above embodiment illustrates an example in which each of the lead wire portions 23 and the power wire portions 30 is formed by a rectangular conductor. However, the present disclosure is not limited to this. Each of the lead wire portions 23 and the power wire portions 30 may be formed by a round conductor having a circular cross section.

The above embodiment illustrates an example in which the resin portion includes the immersing resin portion. However, the present disclosure is not limited to this. The resin portion may be formed by a method (e.g., injection molding) other than the method in which the lead wire portions 23 and the power wire portions 30 are immersed in the resin material, as long as the resin portion is provided so as to cover the lead wire portions 23 and the power wire portions 30.

The above embodiment illustrates an example in which the offset portions 34 (first portions 34a) extending from the corresponding facing portions 32 facing the two lead wire portions 23 of the same phase extend in the same direction from the corresponding facing portions 32. However, the present disclosure is not limited to this. The offset portions 34 (first portions 34a) may extend in opposite directions from the corresponding facing portions 32. In this case, the power wire extended portion 33 (second portion 34b of the offset portion 34) is located in the middle between the two lead wire portions 23 in the circumferential direction.

DESCRIPTION OF THE REFERENCE NUMERALS 10 stator core
10a end face
13 slot
20 coil
21 slot-housed portion
22 coil end portion
23 lead wire portion
23a end-side portion
23d lead wire extended portion
30 power wire portion
30a terminal fixing portion
30b hole
31 joint portion
32 facing portion
33 power wire extended portion
34 offset portion (extended portion separating portion)
34a first portion
34b second portion
34c end
40 immersing resin portion (resin portion)
100 stator
230 same-phase lead wire portion
C1 clearance
L1, L2 distance (distance by which lead wire extended portion is separated from power wire extended portion)
L11, L12 distance (distance by which lead wire extended portion is separated from power wire extended portion in circumferential direction)
O center
α line segment

The invention claimed is:

1. A stator, comprising:
a stator core including slots;
a coil including slot-housed portions housed in the slots, a coil end portion protruding from an end face in an axial direction of the stator core, and a lead wire portion to which external electric power is supplied;
a power wire portion that includes a joint portion joined to an end-side portion of the lead wire portion and a facing portion continuous with the joint portion and located next to the end-side portion with clearance between the facing portion and the end-side portion, and that supplies the external electric power to the coil; and
a resin portion provided so as to cover the lead wire portion and the power wire portion, with the clearance between the facing portion and the end-side portion being located within the resin portion, wherein
the lead wire portion and the power wire portion include a lead wire extended portion and a power wire extended portion that are extended from the resin portion, respectively, and
either or both of a portion of the lead wire portion that is located between the end-side portion and the lead wire extended portion and a portion of the power wire portion that is located between the facing portion and the power wire extended portion include an extended portion separating portion, the extended portion separating portion being configured to extend the lead wire extended portion and the power wire extended portion from the resin portion in such a manner that the lead wire extended portion and the power wire extended portion are separated from each other by a distance that is greater than a maximum value of a width of the clearance in a direction in which the end-side portion and the facing portion face each other.

2. The stator according to claim 1, wherein the extended portion separating portion is not provided in the lead wire portion, and is connected to the facing portion and the power wire extended portion in the power wire portion.

3. The stator according to claim 2, wherein
the lead wire portion is provided so as to extend in the axial direction inside the resin portion,
the end-side portion of the lead wire portion and the facing portion of the power wire portion are provided so as to face each other in a radial direction, and
the extended portion separating portion includes an offset portion, the offset portion including a first portion provided so as to extend in a circumferential direction from the facing portion, and a second portion extending in the axial direction from an opposite end of the first portion from the facing portion and connected to the power wire extended portion.

4. The stator according to claim 3, wherein the lead wire extended portion and the power wire extended portion are located so as to be shifted in circumferential position from each other by the first portion of the offset portion, and are thus separated from each other in the circumferential direction by a distance equal to or greater than a circumferential width of the lead wire portion.

5. The stator according to claim 1, wherein
the coil is configured in such a manner that a same-phase lead wire portion in which a plurality of the lead wire portions of a same phase is located next to each other in the circumferential direction is provided for each of a plurality of phases,
each of the power wire portions corresponding to the plurality of phases includes a plurality of the joint portions joined to the end-side portions of the plurality of lead wire portions of a corresponding one of the same-phase lead wire portions, a plurality of the facing portions continuous with the plurality of joint portions, and the extended portion separating portion connecting the plurality of facing portions and the power wire extended portion, and
in each of the plurality of phases, the same-phase lead wire portion, the plurality of joint portions, and the extended portion separating portion are integrally covered with the common resin portion, and the common resin portions corresponding to the plurality of phases protrude radially outward from the stator core and are provided as a single resin portion on a concentric circumference.

6. The stator according to claim 1, wherein the extended portion separating portion is located so as to extend in the circumferential direction as viewed in the axial direction, and is provided so as to extend from the facing portion in a direction toward a terminal fixing portion located at an opposite end of the power wire portion from the joint portion.

7. The stator according to claim 1, wherein the power wire extended portion is located perpendicularly to a line segment connecting a center of a hole and the power wire extended portion as viewed in the axial direction, the hole being a hole that is provided in a terminal fixing portion located at an opposite end of the power wire portion from the joint portion and into which an external terminal is inserted.

8. The stator according to claim 1, wherein the power wire portion is formed in such a manner that a position of the joint portion is shifted toward the lead wire portion with respect to a position of the facing portion.

* * * * *